United States Patent
Banks et al.

(10) Patent No.: US 7,383,541 B1
(45) Date of Patent: Jun. 3, 2008

(54) METHOD AND APPARATUS PROVIDING INTEROPERATION OF EXECUTION IMAGES OF DIFFERENT VERSIONS

(75) Inventors: Donald E. Banks, San Jose, CA (US); Thomas W. Uban, Valparaiso, IN (US); Timothy P. Donahue, Natick, MA (US); Denis H. Leclerc, Sterling, MA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

(21) Appl. No.: 10/638,149

(22) Filed: Aug. 7, 2003

(51) Int. Cl.
    *G06F 9/44* (2006.01)
(52) U.S. Cl. .................. 717/131; 717/126; 717/130
(58) Field of Classification Search ......... 717/168–178
    See application file for complete search history.

(56) References Cited

U.S. PATENT DOCUMENTS

| | | | |
|---|---|---|---|
| 4,558,413 A | 12/1985 | Schmidt et al. | |
| 5,649,200 A * | 7/1997 | Leblang et al. | 717/122 |
| 5,905,896 A | 5/1999 | Delannoy | |
| 6,006,034 A | 12/1999 | Heath et al. | |
| 6,272,677 B1 | 8/2001 | Lam et al. | |
| 6,272,678 B1 | 8/2001 | Imachi et al. | |
| 6,360,366 B1 | 3/2002 | Heath et al. | |
| 6,519,767 B1 * | 2/2003 | Carter et al. | 717/140 |
| 6,598,060 B2 | 7/2003 | Goldick | |
| 6,658,659 B2 * | 12/2003 | Hiller et al. | 717/170 |
| 6,826,750 B1 * | 11/2004 | Curtis et al. | 717/170 |

* cited by examiner

*Primary Examiner*—Chuck Kendall
(74) *Attorney, Agent, or Firm*—Hickman Palermo Truong & Becker LLP

(57) ABSTRACT

A method is disclosed for providing interoperation of a first execution image of a first version and a second execution image of a second version. A compatibility matrix specifies whether the versions are compatible, base-level compatible, or incompatible. In one embodiment, the compatibility matrix may comprise a sparse table that stores a compatibility indicator for all permutations of a plurality of versions of a network operating system. As part of initialization of a system that includes the first execution image and second execution image, version information for the execution images is determined. An entry in the compatibility matrix corresponding to the versions is identified. The execution images are operated in a fully synchronized state when the identified entry of the compatibility matrix specifies that the versions are either compatible or base-level compatible. Individual components of the execution images interoperate according to the results of individual session negotiations. If the versions are incompatible, an alternative redundancy operation mode may be used. Embodiments provide for negotiation of compatible message versions and capabilities among peer components or clients of the execution images as source information to generate the compatibility matrix.

38 Claims, 9 Drawing Sheets

METHOD AND APPARATUS PROVIDING INTEROPERATION OF EXECUTION IMAGES OF DIFFERENT VERSIONS

FIELD OF THE INVENTION

The invention relates to a method and apparatus for providing continued correct interoperation of computer software implementations even when the versions of the implementations differ.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In data processing the need to provide for interoperation of computer software implementations of different versions, arises in certain contexts. Consider a system that is configured with redundant processors where one or more processors provide service as the Active processor while another redundant processor acts as the Standby that provides a backup for one or more Active processors. The Active processor communicates state information to the Standby processor so that the Standby processor may assume the role of an Active processor at any time after initial state synchronization has been accomplished. During normal system operation, the Standby processor waits to assume control should an Active processor fail or should an external agent request the Standby processor to assume the role of an Active processor. The procedure by which the Standby processor assumes the role of an Active processor is referred to herein as a "switchover." Because software components running in the Active and Standby processors exchange state information during normal operation and a Standby application is always kept in the same state as its corresponding Active peer, the switchover process is termed "stateful switchover."

During normal operation, during an equipment upgrade, or during a software upgrade or downgrade operation, the Active and Standby processors may be of different hardware revision or capability, or the Active and Standby processors may be running different software or firmware images containing code at different release levels. In such circumstances, ensuring the ability to compatibly communicate state information between the Active and Standby processors is essential for providing non-disruptive or minimally disruptive switchover and, thereby, non-disruptive or minimally disruptive hardware or software upgrade and downgrade.

In computer network environments that use packet-switched routing, users desire to have a way to accomplish stateful switchover from an Active router to a Standby router without service interruption, even when the Active and Standby routers have different versions of network operating system or other software or firmware running. Users desire this capability to accomplish a "hitless" upgrade/downgrade. Thus, there are two reasons for wanting a "hitless" stateful switchover: to provide protection against unplanned outages (failures); and to provide the capability to allow software and/or hardware upgrades in a hitless manner for planned outages (upgrades).

The ability of the Active and Standby peers to exchange state information must be determined before the peer applications begin to interoperate. Assuming that the Active and Standby peers can successfully exchange state information until the time some incompatibility is detected, and then to attempt a failure recovery, is not feasible. Instead, interoperability must be determined when the two processors and software or firmware images begin to communicate as a redundant system, so that the system configures itself appropriately and behaves correctly before, during, and after switchover. Some method of determining interoperability early on is therefore required.

Manual methods of determining overall system interoperability are both resource intensive and error prone. An automatic method is required. In addition, if a given feature or application included in an image is incompatible but never used by a particular customer, from that customer's point of view, the two releases are compatible. Declaring the images incompatible because one or more unused features are incompatible is possible, but does not provide any advantage to the user.

Based on the foregoing, there is a clear need for a way to determine whether a plurality of software implementations of different versions are interoperable.

There is a specific need for a way to determine whether peer processors, one Active, one Standby in a distributed router for a packet-switched network can intercommunicate, where the processors each may execute an operating system, applications or firmware of a different version. A similar need exists with respect to line cards.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
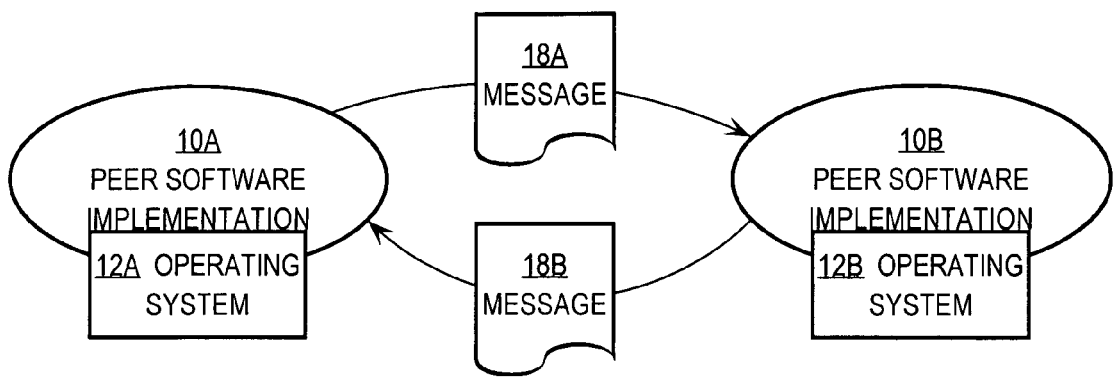
FIG. 1A is a block diagram of peer processes and related components.

A method and apparatus for providing interoperation of computer processes of different versions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Operating Environments
   2.2 Versioning and Compatibility in General
3.0 Method of Providing Interoperation of Computer Processes of Different Versions
   3.1 Creating a Compatibility Matrix
   3.2 Using the Compatibility Matrix
   3.3 Message Version Negotiation
   3.4 Capability Exchange
   3.5 Other Versioning Approaches
4.0 Implementation Mechanisms-Hardware Overview
5.0 Extensions and Alternatives 1.0 General Overview The needs identified in the foregoing Background, and other needs and objects that will become apparent for the following description, are achieved in the present invention, which comprises, in one aspect, a method for providing interoperation of a first software implementation of a first version and a second software implementation of a second version.

Typically the first version and second version execute in elements of a distributed system. In other embodiments, the approaches herein may be applied to versioned restartable processes in a single processor under a single operating system. In a distributed system approach, the system is set in a special configuration mode for the purpose of generating compatibility information. Sub-components of the first version and second, termed "clients" herein, register and are assigned unique identifiers. Pairs of clients then negotiate whether they are incompatible or compatible for a particular session. The compatibility information is stored, and the negotiation is repeated for all pairs of clients and peer software implementations.

Thereafter, peer images executing in a normal operational mode that need to determine compatibility will access the compatibility information. Based on the outcome of the client negotiations, and based on whether the clients are in a list of required base-level components, a determination is made as to whether the first software implementation and second software implementation are compatible, base-level compatible, or incompatible as a whole. A value representing the degree of compatibility resulting from the determination is placed in an entry in a compatibility matrix. The compatibility matrix is incorporated within the software implementations. Thus, the compatibility matrix is generated only once, and then becomes available for reference by peer software implementations.

The compatibility matrix specifies whether a pair of images are compatible, base-level compatible, or incompatible. In this context, a pair of images is "compatible" when all features, applications or other "clients" of the images are capable of interoperating, is "base-level compatible" when at least the base level clients (those required for proper system operation) are capable of interoperating, or "incompatible" when at least one base-level client cannot interoperate with its peer.

"Base-level" features or applications typically are core protocols or other essential functional elements that must be compatible for two different images to interoperate. The specific definition of required base-level features may vary from image to image and system to system. In certain embodiments, a list of required base-level features is stored for use in the processes described herein.

In subsequent execution of the software implementations in the distributed system, one of the software implementations can determine, based on retrieving the entry from the matrix, whether to operate with the other software implementation in a stateful switchover mode. Such decisions made based on compatibility matrix values are made with reference to an entire software image rather than on the basis of individual components. The decisions determine operating mode, but do not specify how individual components interact; the components determine a level of interaction dynamically through a separate, later negotiation.

In one embodiment, the compatibility matrix may comprise a single row from a sparse table that stores a compatibility indicator for all permutations of a plurality of versions of a network operating system compared with the version of this network operating system. During initialization of a system that includes the first image and second image, version information for the images is exchanged. An entry in the compatibility matrix corresponding to the image versions is identified and retrieved from the newest version. The identified entry of the compatibility matrix specifies whether image versions as a whole are either compatible, base level compatible or incompatible.

Individual components of the images interoperate according to the results of individual session negotiations that take place after initialization. If the image versions are incompatible, an alternative redundancy operation mode must be used. Embodiments provide for negotiation of compatible message versions among peer components of the images.

In other aspects, the invention encompasses a computer apparatus and a computer-readable medium configured to carry out the foregoing steps.

2.0 Structural and Functional Overview

FIG. 1A is a block diagram of peer software implementations and related components. A first software implementation 10A and a second software implementation 10B communicate using messages 18A, 18B. Each software implementation 10A, 10B may execute under supervision of an operating system 12A, 12B, respectively, which comprises one or more applications or features. Typically each software implementation 10A, 10B is stateful, meaning that the Active process updates the Standby process with state information during execution, so that the Standby process can immediately assume the role of the Active process and continue to provide services previously provided by the Active when a switchover occurs. In this description, the term "software implementation" is used broadly to refer to any software element, firmware, microcode, or a combination thereof. The term includes peer processes that are instantiations of applications, features, or operating system functions. Further, the functionality described herein is not limited to a process environment, and can be used at interrupt level outside the strict scope of an operating system process. The term "peer" and "peer process" is used interchangeably to refer to a software element that is participating in the techniques herein.

In this arrangement, one or more elements may have different versions. For example, operating system 12A of software implementation 10A may be the same as operating system 12B but a different version. While an image, consisting of one of the operating systems 12A, 12B and one or more applications, may differ only with respect to one application, the techniques herein enable the software implementations 10A, 10B to interoperate when the versions of messages 18A, 18B are different. In each case, there is a need to provide a way for the software implementations 10A, 10B to communicate, despite differences in versions of one or more of the elements of FIG. 1A.

Figure 1B:
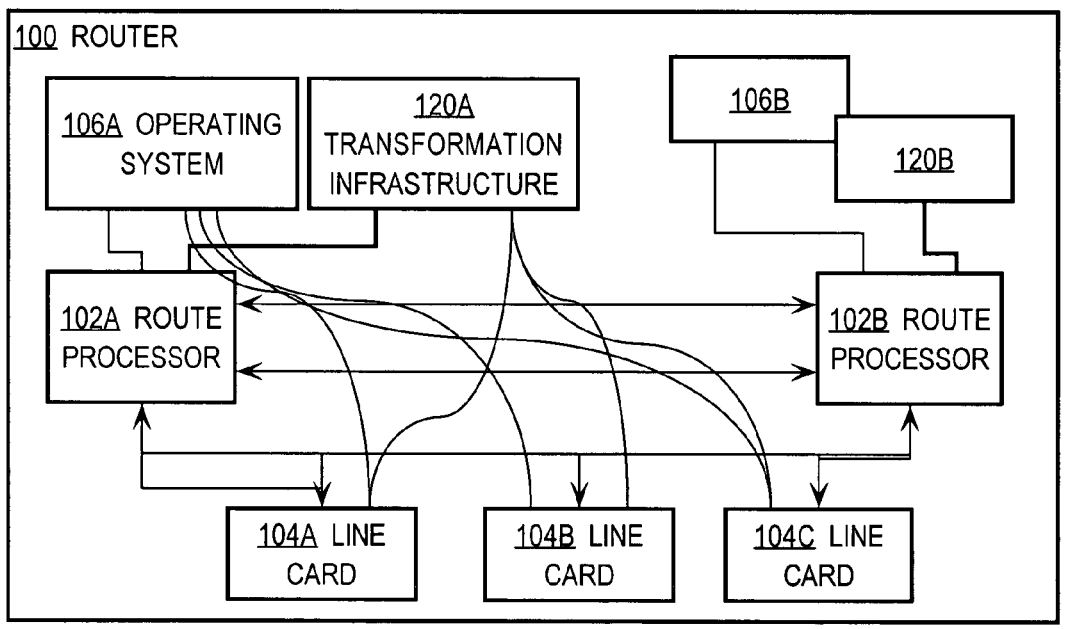
FIG. 1B is a simplified block diagram of a router for a packet-switched network, the router having a plurality of route processors and line cards.

FIG. 1B is a simplified block diagram of a router for a packet-switched network, the router having a plurality of route processors and line cards. FIG. 1B illustrates a specific scenario in which the general problems illustrated for FIG. 1A may arise. However, the techniques herein are applicable to other contexts. For example, while FIG. 1B depicts route processors, the techniques herein are equally applicable to line cards, processors that are not route processors, and others. In FIG. 1B, a router 100 comprises a first route processor 102A and a second route processor 102B. Each of the processors 102A, 102B is communicatively coupled to one or more line cards 104A, 104B, 104C. There may be any number of line cards.

Each of the route processors 102A, 102B executes or interacts with a respective instance of an operating system 106A, 106B and a respective instance of a message transformation infrastructure 120A, 120B. For example, route processor 102A is associated with operating system 106A and message transformation infrastructure 120A; similarly, route processor 102B uses operating system 106B and message transformation infrastructure 120B. Operating system 106A, 106B may be instances of the same version or different versions. Message transformation infrastructures 120A, 120B may be identical instances when their versions are the same, or may be different instances when their versions are different. Message transformation infrastructures 120A, 120B generally are responsible for transforming messages of one version into messages of another version, although only one up-level infrastructure operates in a given configuration. Message transformation infrastructures 120A, 120B enable interoperation of peer software implementations 10A, 10B (FIG. 1A), such as operating system 106A, 106B, and peer clients thereof. The use of message transformation infrastructures 120A, 120B is described further below.

Route processors 102A, 102B typically serve as Active and Standby processors, respectively. The Active and Standby processors may comprise route processors, line cards, etc. Each of the route processors 102A, 102B may host one or more processes, including an operating system, applications or features (collectively "peer clients"). To illustrate a clear example, FIG. 1B shows two route processors 102A, 102B; however, in practice there may be any number of Active and Standby processors.

The techniques herein are generally applicable to routers, switches, gateways, etc. In one embodiment, compatibility information created and stored in a pre-processing phase, and is available later in a runtime phase when the system first initializes so that the appropriate redundant system behavior can be determined at that time.

In one specific embodiment, two images for a particular pair of card types initially execute in a special mode with all supported features and applications configured, and then store the results of all of the compatibility negotiations to an external destination. A utility then processes the results and creates an entry in a static table that declares overall compatibility of the two images. By running all supported pairs of images in this manner, a compatibility matrix is constructed from the static table entries. This matrix then is used to dynamically determine interoperability during initialization.

According to one embodiment, peer software implementations executed by route processors 102A, 102B are set in a special configuration mode for the purpose of generating compatibility information. Each client of the peer software registers, negotiates whether it is compatible or incompatible with a corresponding client of the other peer, and reports a result of the negotiation, which is stored.

The result of the negotiation also affects how clients interoperate subsequently. If clients determine that they are compatible, then the peers can use the session to synchronize their state information and will participate in a stateful switchover, should one occur. If the clients are incompatible, then each client is expected to revert to non-stateful behavior. The negotiation and determination is repeated for each session, for each client within a peer software implementation or version.

Thereafter, a compatibility matrix entry is created for the pair of peer software implementations, based on the stored compatibility information and a list of required base-level clients.

The compatibility matrix may be created using a utility process that executes offline with respect to the peers. The foregoing process may be repeated for all pairs of software implementations or versions until a complete compatibility matrix is created and stored. The complete compatibility matrix is incorporated into the software implementations or versions, or into an operating system that is associated with them.

Thereafter, the peer software implementations executed by route processors 102A, 102B are set in a normal operation mode. The peer software implementations that are contained in and executed by route processors 102A, 102B first exchange image version information. The software implementation having the higher version then retrieves a compatibility matrix entry that corresponds to the versions of the peers. The entry specifies whether the peers are compatible, base-level compatible or incompatible, and the value may be sent to the peers.

If the peer software implementations are either compatible or base level compatible, then all of the base level clients and probably some of the non-base level clients are compatible, and they can later perform failover processing using stateful switchover. Clients that decide they are incompatible run in a non-stateful manner. If the peer software implementations are incompatible, then all clients within the peer software implementations do not exchange state information, and when failover occurs, the peer software implementations use a non-stateful failover approach. Thus, reversion to a non-stateful switchover mode is done on an entire image basis, for particular pairs of card types, based on the result from the matrix for the two image versions. Reversion to non-stateful behavior while running in stateful switchover mode is done on a client-by-client basis based on the results of the dynamic negotiation that yields the compatibility matrix.

After image compatibility is determined, peer clients negotiate the highest message version that they will use to communicate. Each peer client sends messages using a native version level, which may be greater than or less than the version level that is supported by a peer client. If a first peer supports a higher message version than the second peer, the first peer (an "up-level peer") calls a versioning infrastructure to result in transforming received messages to its higher native version ("upgrades"), and calls the versioning infrastructure to transform sent messages to the second peer's lower version ("downgrades") as required.

In this arrangement, an individual peer client may be unable to upgrade or downgrade a particular version of a message because the modifications made to the message content cannot be meaningfully upgraded or downgraded to provide interoperability for the peer client. Such clients will negotiate an "incompatible" relationship for such messages.

As part of negotiating compatibility among peer clients, a capability exchange approach may be used. As a result, peer software implementations eventually negotiate to a compatible feature set between the two different versions. However, some features supported only by a new version of a software implementation may be required, or an old feature may no longer be able to be supported and cause the peer clients to declare incompatibility.

In certain embodiments, the incompatibility of features or applications that are unused, or unimportant to a particular user, is determined based on how router 100 of FIG. 1B is configured. In this embodiment, even if one or more features is incapable of interoperating, the foregoing processes continue to be used to determine compatibility. Each feature is uniquely identified and declared as either "required" for base-level compatibility or "optional." Information identifying the client is saved with the compatibility data, and integrated with the information indicating whether a component or feature is "required" or "optional."

Embodiments also address use of a feature or application that is not interoperable when it is configured in a base-level compatible environment. A solution is provided that is simple for an application to implement and is compatible with behavior in redundant, non-stateful environments. In one approach, when the feature or application dynamically negotiates and determines that it is not interoperable with its peer in a pair of image versions, the feature or application reverts to non-stateful behavior, while the compatible components continue to interoperate in a stateful manner. An interruption of service may occur for this feature or application if a switchover takes place. However, other independent features will retain stateful switchover behavior and perform switchover in a fully stateful manner. This is desirable as it will usually reduce the loss of service incurred during a switchover, as compared to a switchover when the entire system is operating entirely in a synchronized or stateful Standby mode.

Thus, in general, in various embodiments described herein, dynamic version and capability negotiation provide the basis for interoperability of feature/application peers at different release levels. Pairs of fully configured images execute in a special configuration mode to generate and save results of dynamic negotiations. The results are processed offline using a utility that generates an entry in an interoperability matrix for that particular pair of images. Each feature or application is assigned a unique identifier. Each identifier is assigned a role as either a required "base-level" or "optional" feature. The utility process examines the results of all negotiations for a pair of images. If all negotiations succeeded, the entry for the two image versions is marked "compatible." If any "base-level" feature failed, then the entry is marked "incompatible." Otherwise, the entry is marked "base-level compatible."

By using the approach herein, the upgrade and downgrade of messages in applications and features is more practical, more easily implemented, and more reliable and useful to users. All interoperability relationships are known and determined by the implementations themselves. These relationships can be published and displayed so customers and engineers can determine ahead of time (or while the system is running) what behavior to expect between the two images. Ignoring application bugs and design errors, this makes the process deterministic and the automatic tooling makes it far less costly than a manual testing or inspection process would be.

Embodiments are not limited to use in network device operating systems. Embodiments are applicable to any system that employs message versioning and a stateful transition between two differing processes including software, firmware, field programmable devices or microcode images. Embodiments may be used in arrangements that involve more than two peers, such as N+1 configurations.

According to one specific embodiment, in a redundant route processor system, a means to upgrade or downgrade operating system software on the Standby route processor or line cards, without incurring a service outage upon switchover, is provided. In this embodiment, all operating system images executed by route processors in the system have an image version value, such as a version number. All messages in all communications between entities provide a means to determine message type. Further, each route processor can call a version processing infrastructure that has one or more transformation functions that can transform outbound messages from the latest version used by a first route processor (its "native version") into one or more lower versions used by peer route processors. In one specific embodiment, implementations of the transformation functions are provided by the peer clients for each session that they establish. The transformation functions also can transform received messages from the one or more lower versions into the latest version used by the route processor. When more than one transformation function is required, the transformation functions are chained together to accomplish transformation across multiple versions.

Figure 2A:
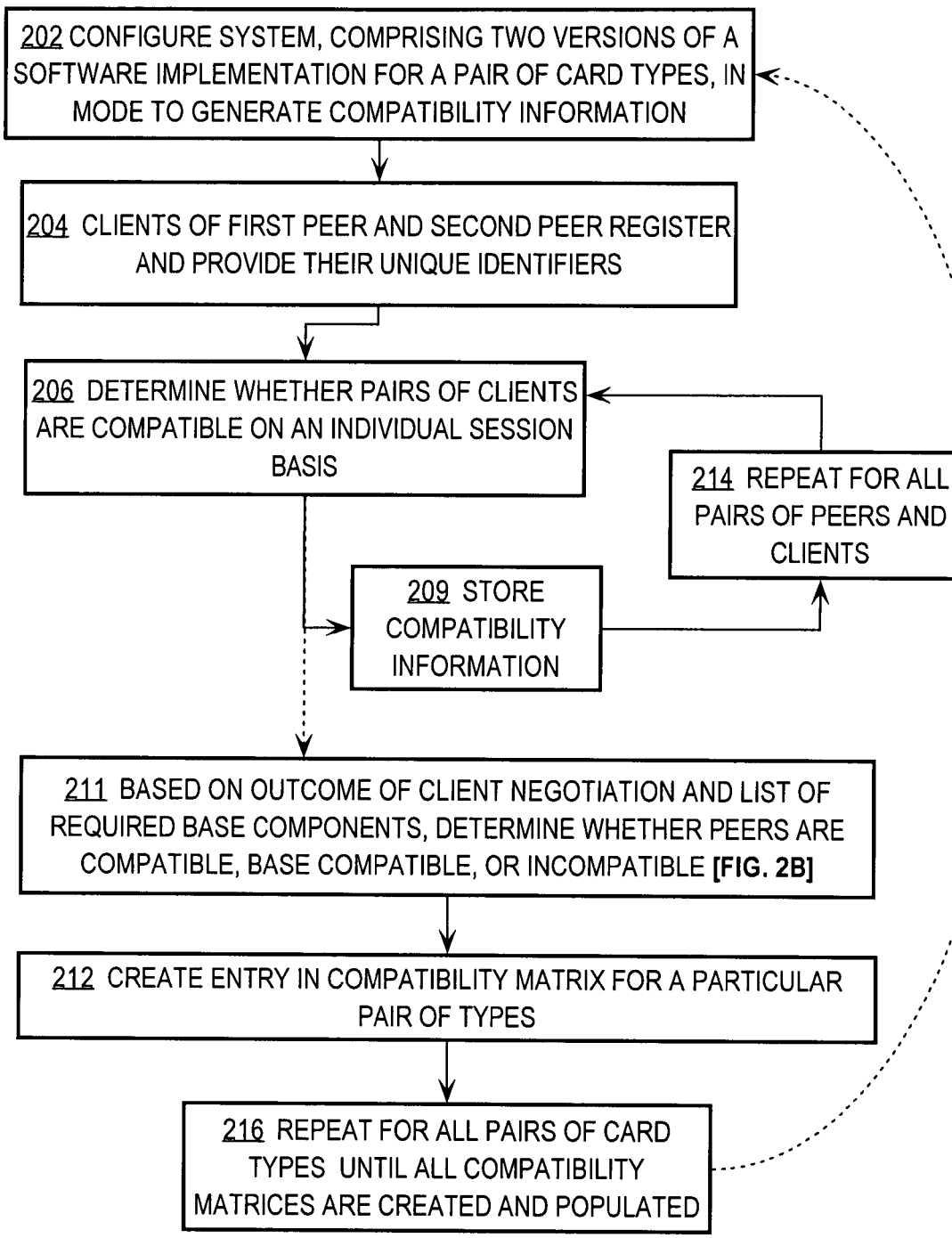
FIG. 2A is a flow diagram of a method of generating process compatibility information.
Figure 2B:
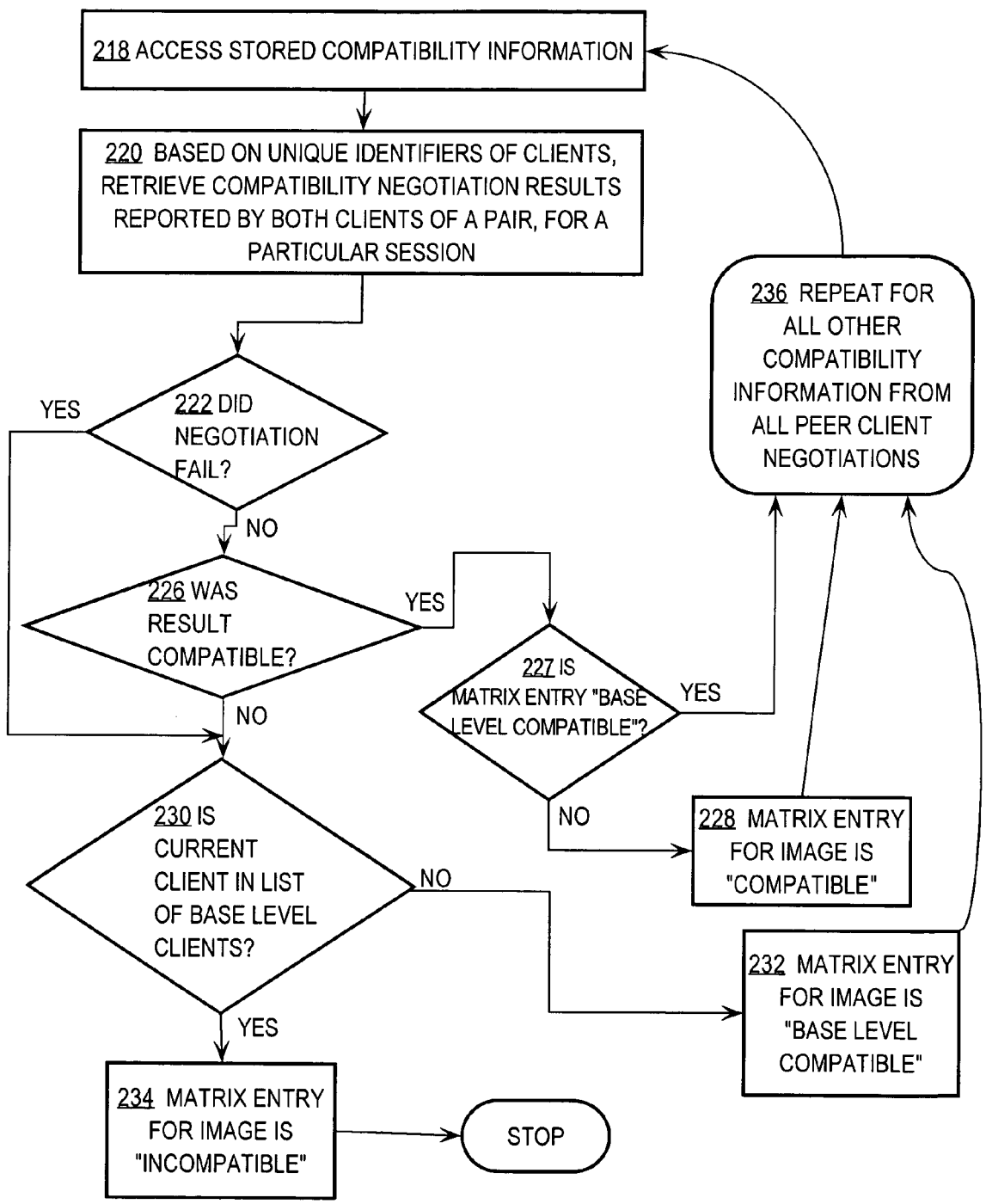
FIG. 2B is a flow diagram of further steps in the process of FIG. 2A.

3.0 Method of Providing Interoperation of Computer Processes of Different Versions 3.1 Creating a Compatibility Matrix FIG. 2A and FIG. 2B are flow diagrams of a method of generating process compatibility information. For purposes of illustrating a clear example, the process of FIG. 2A, FIG. 2B is described herein with reference to the router of FIG. 1B. However, other embodiments of FIG. 2A, FIG. 2B may be used with other processes or in other contexts. According to one embodiment, a compatibility matrix data structure cross-correlates a plurality of versions or releases of images containing the operating system and its applications. Each entry in the matrix stores information indicating whether a particular version is compatible with another version. Portions of the process of FIG. 2A, FIG. 2B may be used to generate compatibility information for a single intersection of two versions or releases of images within the matrix, and iteration of the process results in fully populating the matrix. In one approach, a unique compatibility matrix is created for each set of peer types of a platform. For example, on a given platform, a first matrix describes compatibility between route processors of a particular type, and a second matrix describes compatibility between the route processor and line cards of a particular type, e.g., an asynchronous transfer mode (ATM) line card that supports in-service upgrading.

For purposes of illustrating a clear example, the discussion herein describes creating one compatibility matrix. However, more than one matrix may be produced in other configurations. For example, there may be a matrix that represents the compatibility between route processors, and one for each combination of RP and a unique type of line card, rather than for each pair of peers.

Referring first to FIG. 2A, in block 202, a system comprising a first version of a software implementation and a second version of a software implementation, for a pair of router card types, is configured in an operating mode that enables generating compatibility information. For example, in one embodiment, the peer software implementations are configured to operate in a special configuration mode that is used to generate software implementation compatibility information by issuing a specified command to result in setting a specified flag at each peer. In a normal operation mode, upon initialization the operating system of one peer normally determines its compatibility with the other peer by consulting a compatibility matrix, which is described further below. For example, the peer with the highest version decides. However, in the special configuration mode the operating system of each peer is made responsive to a flag value, which is set via a command, that causes the peer to ignore the matrix, to "dump" or store a version identifier of the operating system, to perform a message negotiation process with the other peer, and to store or "dump" information indicating results of the version negotiation.

As indicated in block 204, clients of the first peer and second peer register and provide unique identifiers. For example, each component, application, protocol or feature of the operating system executed by a peer route processor is has a unique client identifier value, which it reports as part of registration. Use of unique client identifiers enables the process to correlate components with peer processes and to determine which components are compatible in a negotiation phase, which is described next.

In block 206, a negotiation process is performed to determine whether corresponding clients of the first peer and the second peer are compatible on an individual session basis. If so, the negotiation yields a compatible message version. Alternatively, the negotiation may result in a determination that corresponding components are not compatible.

In block 209, the results of the compatibility negotiation of block 206 are stored. For example, an entry identifying the components by their unique identifiers, and an outcome value indicating compatibility, is stored in a memory table, file or database. In block 214, the steps of block 206 and block 209 are repeated for all other clients of the first and second peers.

Thereafter, block 211, block 212, and block 216 may be performed offline, for example, by a separate utility program or process. In block 211, a determination is made, based on the outcome of the message negotiation of block 206 to block 210 and a list of required base-level components, whether each of the software implementations as a whole is compatible, base-level compatible, or incompatible with a corresponding software implementation. The list of required base-level components indicates which components of a second peer must have compatibility with counterpart components of a first peer for the peers to be base-level compatible. The required base-level components in an IP packet networking application might include the inter-RP and RP-line card communications modules, one or more IP routing protocols, and the agent used to construct and manage the IP forwarding table. An example list of required base-level components could include Inter-processor Communication (IPC) code, checkpointing code, system redundancy control code, forwarding table management code, and hardware drivers.

In block 212, an entry reflecting the compatibility determination of block 211 for a particular pair of types is made in a compatibility matrix. The compatibility matrix is a data structure that maps compatibility values associated with versions or releases of an image made up of the network device operating system, feature or application to other compatibility values of other versions or releases for a pair of like groups of devices (e.g., two RPs, an RP and ATM line cards for a platform, etc.). Table 1 below presents an example compatibility matrix for nine versions of a network device operating system image.

TABLE 1

EXAMPLE COMPATIBILITY MATRIX

|    | v1 | v2 | v3 | v4 | v5 | v6 | v7 | v8 | v9 |
|----|----|----|----|----|----|----|----|----|----|
| v1 | C  | C  | C  | C  | C  | B  | I  | I  | I  |
| v2 |    | C  | C  | C  | C  | C  | C  | I  | I  |
| v3 |    |    | C  | C  | C  | C  | C  | B  | I  |
| v4 |    |    |    | C  | C  | C  | C  | C  | C  |
| v5 |    |    |    |    | C  | C  | C  | C  | C  |
| v6 |    |    |    |    |    | C  | C  | C  | C  |
| v7 |    |    |    |    |    |    | C  | C  | C  |
| v8 |    |    |    |    |    |    |    | C  | C  |
| v9 |    |    |    |    |    |    |    |    | C  |

Table 1 comprises a table in which each entry is marked as "C" for compatible, "I" for incompatible and "B" for base-level compatible. Thus, for example, version 1 of a software implementation ("v1") is compatible with v5, base-level compatible with v6, and incompatible with v7. Assuming that version-to-version compatibility attributes are transitive and a version is always compatible with itself, the table may be implemented as a sparse table because its values are symmetric; for example, the value at row v9, column v1 would be the same as the value at row v1, column v9, and therefore there is no need to store the former value.

The compatibility matrix need not store separate upgrade and downgrade values, because the results of both the capability and message version negotiations between any two image versions are defined to be transitive; that is, which image version is Active and which is Standby does not affect the value of the results of the negotiations.

The compatibility matrix may carry other information, if desired. Further, compatibility values in the matrix are not specified relative to an Active or Standby role of a process; the compatibility values simply indicate a version-to-version relationship.

In block 216, the steps of block 211 and 212 are repeated for all pairs of card types. As a result, a plurality of compatibility matrices are created and stored, and each compatibility matrix is fully populated for all peers that may potentially interoperate.

The compatibility matrix is stored in a way that it is accessible to the image of each peer. An example of such use of the compatibility matrix is described next.

In one embodiment, the compatibility matrix forms part of a modified operating system image. This has the advantage that the compatibility matrix is available during initialization of the operating system, and its availability does not depend upon the availability of a particular external device or resource.

Additionally, block 216 may involve generating a report that indicates compatibility of one or more releases. Such a report could be used as input for creating release notes for a particular release, for example. Report data also may be useful for end users for planning purposes; with the report data, end users can determine which systems will operate in stateful switchover mode and which systems cannot.

Although only one entry in the compatibility matrix is needed later at runtime to determine compatibility of versions, in certain embodiments, the entire matrix can be displayed or printed for user reference or further processing.

FIG. 2B illustrates additional steps that may be performed as part of block 211. In one approach, the steps of FIG. 2B may be performed by a separate utility program or process that operates offline with respect to peer clients or software implementations.

In block 218, the compatibility information that was stored as part of block 209 is accessed. In block 220, based on the unique identifiers of the clients, compatibility negotiation results that have been reported and stored by corresponding clients are retrieved. The results are then compared in succeeding steps.

For example, in block 222, a test is performed to determine whether negotiation among the clients failed. Failure may occur, for example, an up-level image contains a newly added client that has no counterpart to communicate with in the down-level image. If such a failure occurred, then control passes to block 230, which is described below.

In block 226, a test is performed to determine whether both peers reported compatibility. If so, then in block 227 a test is performed to determine whether a value of "base-level compatible" is already set in the matrix for the peers. If not, then the compatibility matrix entry is set to "compatible," as indicated by block 228. If the test of block 227 is true, then no value is stored because the resulting value only can be either "base-level compatible" or "incompatible." In block 230, if the peer clients were not compatible, then a test is performed to determine if the peer clients are in a list of base-level clients. If not, then the incompatibility relates only to non-base-level clients, and therefore the matrix entry is "base level compatible," as indicated by block 232. However, if the incompatible peer clients are in the base-level client list, then the matrix entry for the image is "incompatible," as shown in block 234.

After performing either block 228 or block 232, control passes to block 236, in which the above steps are repeated for all other compatibility information that was generated for all other peer client negotiations. Thus, all the generated compatibility information is considered, unless a determination of "incompatible" is made at block 234. If the latter occurs, then pairs of images will be incompatible, and therefore further consideration of other peer client compatibility information is not necessary.

The approach of FIG. 2A, FIG. 2B has been described is a pre-process that is typically performed before the compatibility matrix is used at runtime by a process executing in an Active or Standby mode.

3.2 Using the Compatibility Matrix

Figure 3:
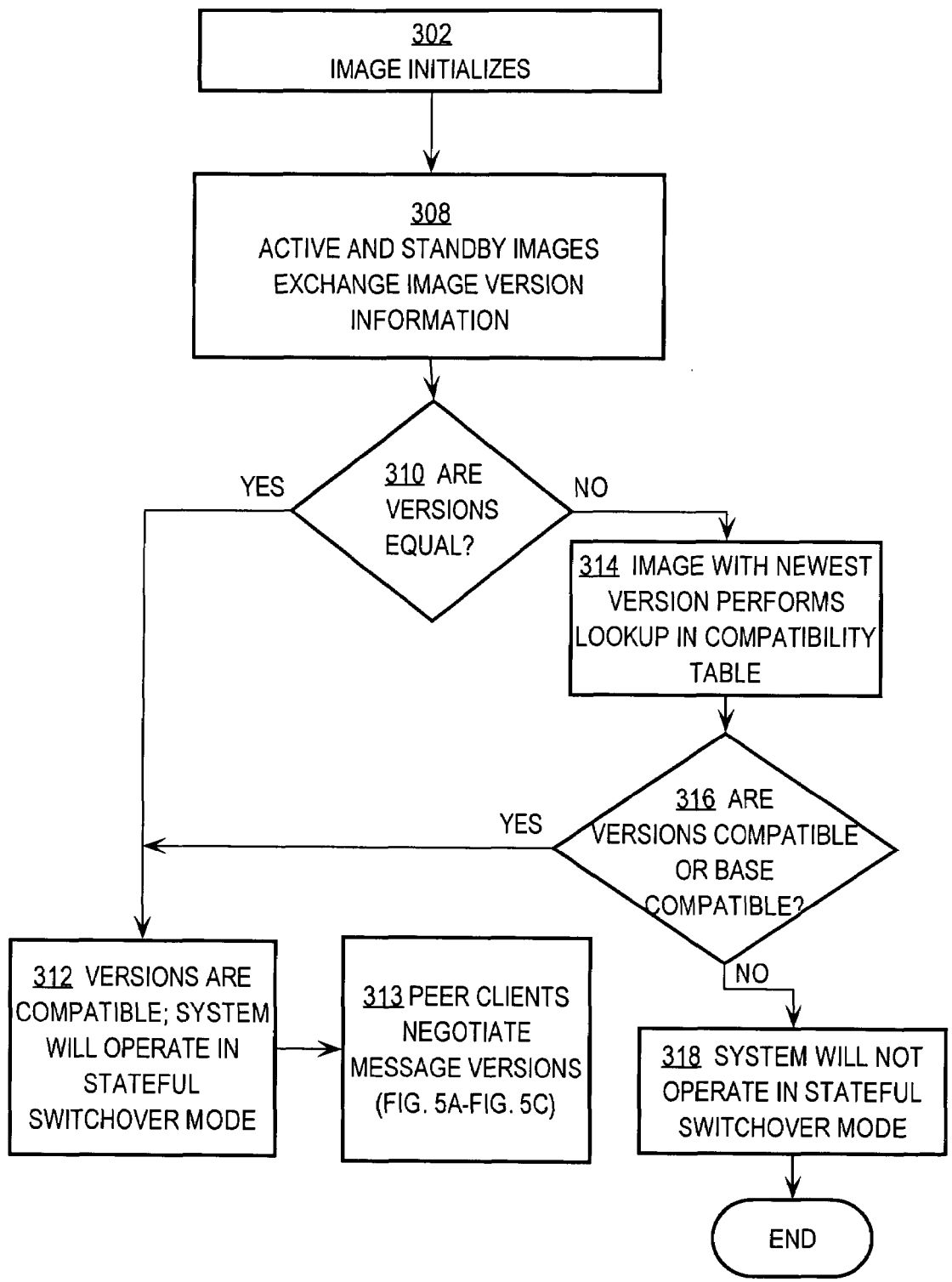
FIG. 3 is a flow diagram of a method of using process compatibility information.

FIG. 3 is a flow diagram of a method of using process compatibility information. In block 302, an image or software implementation initializes. For example, operating system 106A and operating system 106B each initializes by beginning execution on respective route processors 102A, 102B. For example, operating system 106A and operating system 106B determine whether they are executing as active or standby.

In block 308, the active and standby images exchange image version information. For route processors, "version information" generally refers to a version identifier for an operating system that is executed by the route processors. In one embodiment, block 308 is performed at an early stage of initialization. The term "image," as used in FIG. 3, may refer to a software implementation or software image that consists of a collection of software components and an operating system, consisting of one or more software elements, firmware, microcode, or a combination thereof.

In block 310, a test is performed to determine if the versions are equal. If so, then the versions are deemed compatible, and the peers can exchange data in a stateful manner. Therefore, the system will operate in a mode that is fully synchronized ("stateful switchover"), as indicated by block 312.

However, if the versions are not equal, then in block 314, the image with the newest version performs a lookup in the compatibility matrix for an entry associated with the versions of the peer software implementations. Based on the compatibility matrix entry, in block 316 a test is performed to determine whether the versions are compatible or base level compatible. If so, the operating mode is set to stateful switchover mode, as indicated in block 312. Alternatively, if the peers are incompatible, then the system cannot operate in stateful switchover mode, as shown by block 318. Some other operating mode that is not stateful will be used in that case.

If block 312 is reached when the peers are base-level compatible, then one or more non-base-level features of an image are not compatible with corresponding features of the counterpart peer. These features must include logic that can execute properly when other compatible features perform failover in stateful manner. For example, when a particular feature of a first peer is determined to be incompatible with a corresponding feature of a second peer, but the peers are base-level compatible, then that feature of the first peer must have a way to continue executing without interacting with the second peer. Accordingly, individual components within the peer software implementations may negotiate mechanisms for interacting.

When stateful switchover mode has been negotiated, peer clients within the images will then negotiate compatible message versions for use in future communication, as indicated by block 313. An example message version negotiation process is described further below with respect to FIGS. 5A, 5B, 5C 3.3 Message Version Negotiation In general, message versioning facilitates identifying different versions of each message sent between stateful clients. In one approach, the message versioning facilities pre-negotiate version information that allows a particular client to understand which version to use for a particular message. For example, message transformation infrastructures 120A, 120B may negotiate and save version information.

Message versioning also allows for development of a common infrastructure to manage the execution and flow of the required chained transformations. The advantage of message versioning is that any discrepancies in support between clients, such as missing transformation functions, are determined at run time, the first time the two versions are run together. Incompatibilities are reported immediately, allowing problems to be fixed early in development before images are tested or delivered.

In the embodiment of FIG. 1B involving a router 100 having Active and Standby route processors 102A, 102B, in one specific embodiment, the Active and Standby route processors communicate state information using a checkpointing service. All messages communicated in such sessions carry a message type value indicating a type of the messages or provide a means to get the message type. A version applies to a message type, and message types are unique to each conversation or session. The message type and version value combination determines message compatibility among processes. If the processes are compatible, the version values drive a transformation mechanism that allows non-identical versions to interoperate. Such a mechanism may be used for communicating entities that reside in line cards and other elements, and not just for route processors; the communicating entities may be distributed on different physical cards, or co-located on the same processor or card.

Figure 4:
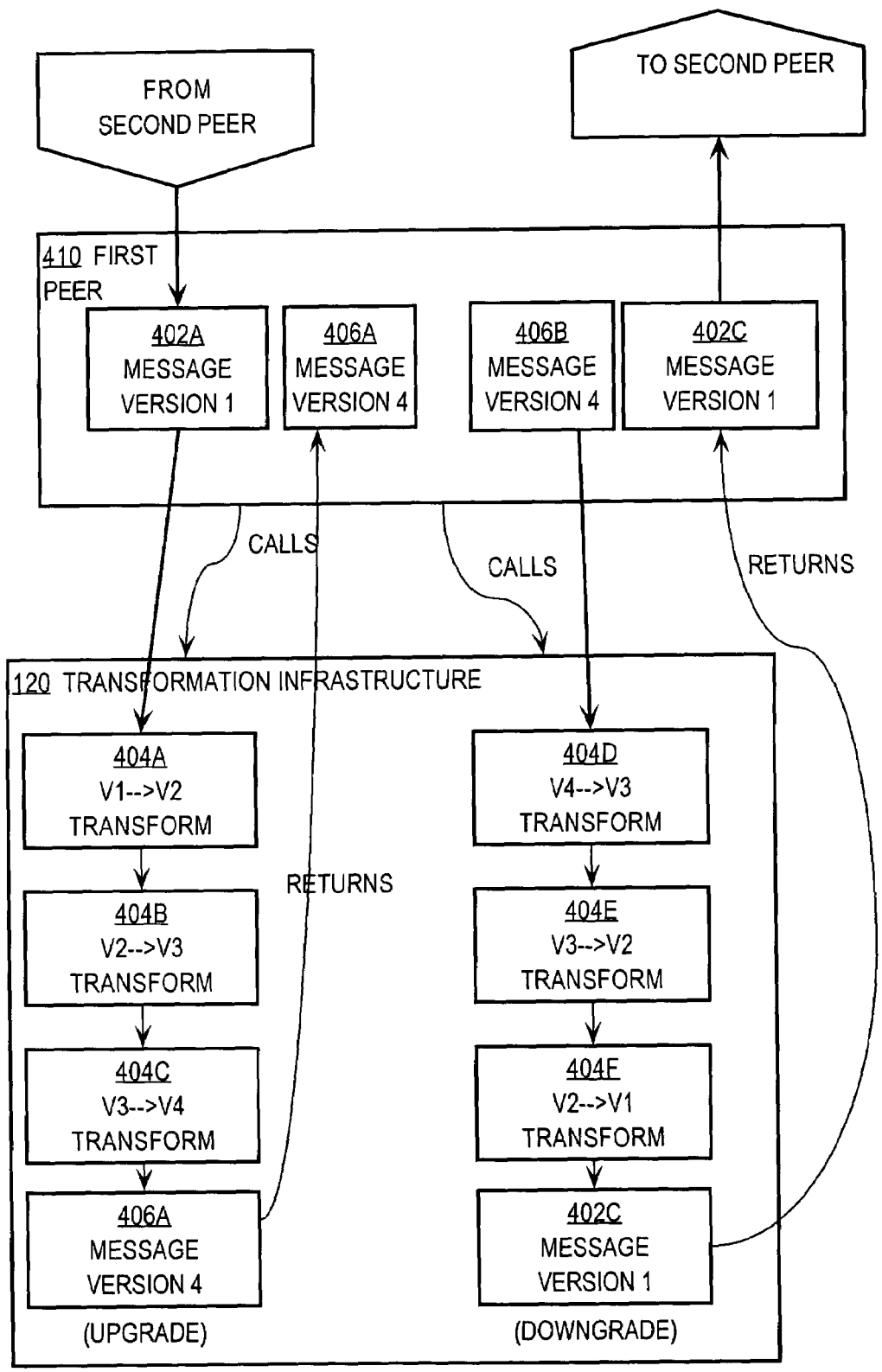
FIG. 4 is a block diagram illustrating use of chained transformation functions for message upgrading and downgrading.

FIG. 4 is a block diagram illustrating use of chained transformation functions for message upgrading and downgrading. FIG. 4 represents a case in which a first peer and a second peer have negotiated that the peers will communicate for a particular message type at version 1 of the message. The up-level peer will perform the message upgrades and downgrades so that each receives a message at its native version.

In one embodiment, messages communicated among peer processes, or their constituent elements ("clients" herein), include a type field that determines which transformation functions are used. The version of messages is not transmitted because it has been agreed on during negotiation and is known by the time any messages are sent or received.

Clients format messages in the highest current version that they support. At transmit time, a client calls transformation infrastructure 120 and passes the message. The transformation infrastructure maintains data structures that contain the client's supported versions for each message type and the results of the version negotiation for each message type. The message header is optional and, if included, contains the message type. Based on the message type and the negotiation results, transformation infrastructure 120 selects one or more transforms 404A, 404B, etc. for each message either as the message is sent or received.

Each client provides transforms 404A, 404B, 404C, etc. and registers the set of upgrade and downgrade functions that it supports with transformation infrastructure 120. An upgrade transform upgrades the data from "version n" to "version n+1". A downgrade transform downgrades the data from "version n" to "version n−1". Each transform updates the message payload as the message is upgraded or downgraded. The set of transforms for a particular message type are chained such that the upgrade transforms are executed in sequence from lowest to highest and the downgrade transforms are executed in sequence from highest to lowest. The output from a previous transform is input to the next transform in sequence until a complete transformation has been achieved.

FIG. 4 illustrates that in one embodiment, a first peer that communicates with a second peer using messages with a higher or newer version will transform a message 402A having a first version using one or more chained transform functions 404A, 404B, 404C into a message 402B having a version that is compatible with the version that the peer expects to receive in this case. The term "process" is used broadly to refer to any software or computing element, and is not limited to processes instantiated by an operating system in the conventional sense.

For example, assume that a first peer natively uses messages of version 4 ("v4") and a second peer natively uses v1. Assume further that the first peer and the second peer have agreed to communicate messages in v1. In this arrangement the first peer always sends messages and receives messages in v1, as indicated by messages 402A and 402C, but internally works with messages in v4, as indicated by messages 406A and 406B. First peer 410, the up-level client, is responsible for performing all transformations needed to change v1 messages into v4 messages and vice versa.

As an example, assume that the first peer 410 receives message 402A of v1 from a second peer. The first peer 410 calls transformation infrastructure 120, which applies a first transform 404A to result in converting the message to v2. The output of first transform 404A is chained or fed to the input of a second transform 404B that results in converting the v2 message to v3. The v3 message is chained to a third transform 404C that converts the v3 message to message 406A in v4. The transformation infrastructure 120 returns message 406A of v4 to the first peer 410. The first peer 410 then can directly interpret and work with message 406A, because the message now is expressed in the native format of the up-level peer.

Similarly, when first peer 410 needs to send an outbound message to a second peer that uses messages of v1, the up-level client causes the internal outbound message 406B of v4 to pass through chained transforms 404D, 404E, 404F, in that order, to result in creating an outbound message 402C of v1. The outbound message 402C is then understandable to the second peer that uses v1.

In certain embodiments, a finite number of transforms may be provided. For example, in most software systems not all versions of all messages are supported in every successive version of the software system. Therefore, the number of transforms may be limited to a particular set of versions of a peer or operating system. However, in other embodiments there may be any number of transforms. Further, in certain situations a change among successive versions of a peer may be so drastic that there is no practical way to support upgrade or downgrade among the versions using transforms as described herein. If such a change occurs in a non base-level feature, then peer images may operate in stateful switchover mode while the feature will not; if the change is to a base-level feature, then the peer images are incompatible and stateful switchover is not used. Alternatively, message version negotiation could result in agreement on only a message version level that the up-level peer can successfully transform using available transforms.

Figure 5A:
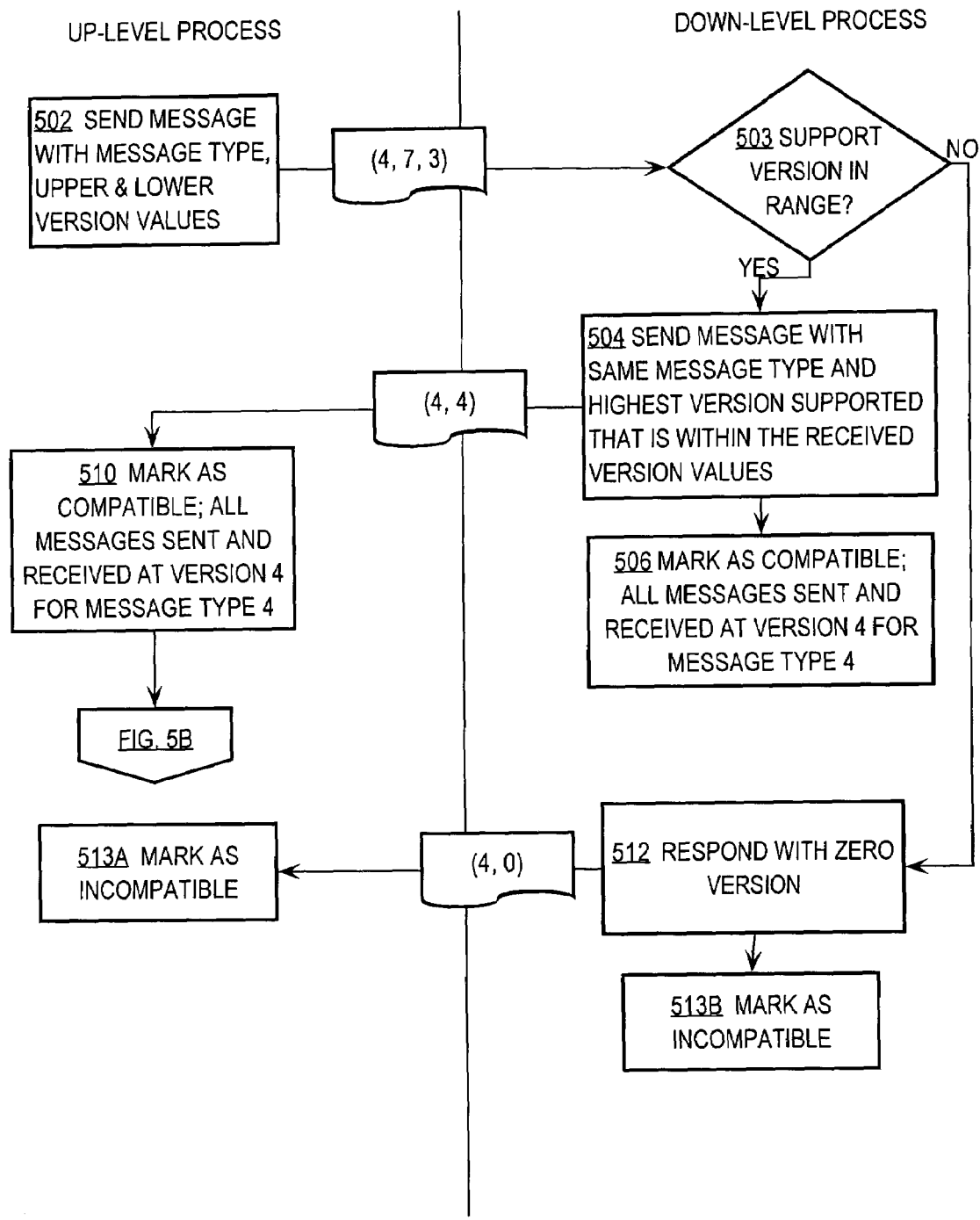
FIG. 5A is a message flow diagram illustrating a method of negotiating message version compatibility between an up-level process and a down-level process.
Figure 5B:
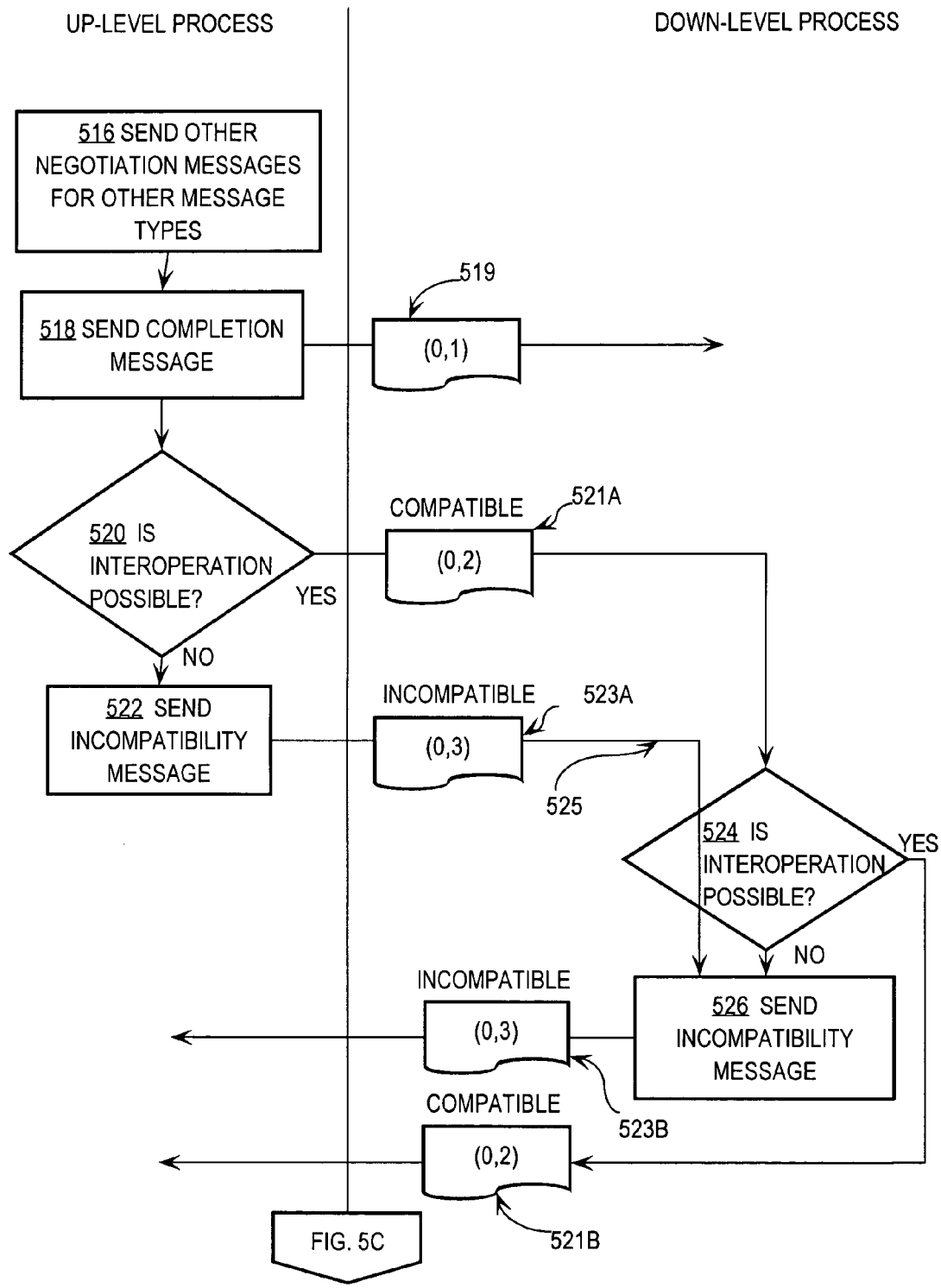
FIG. 5B is a message flow diagram illustrating further steps in the method of FIG. 5A.
Figure 5C:
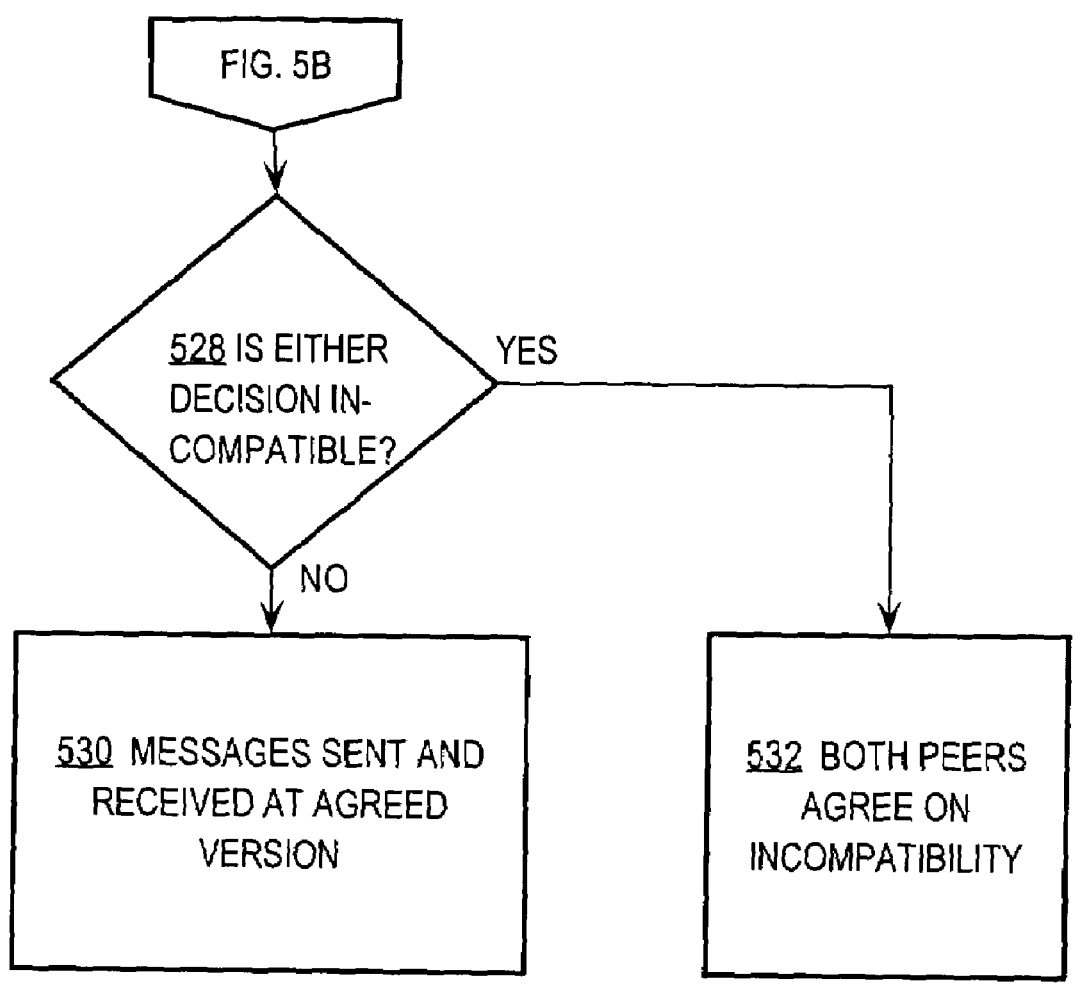
FIG. 5C is a message flow diagram illustrating further steps in the method of FIG. 5A, 5B.

FIG. 5A is a message flow diagram illustrating a method of negotiating message version compatibility between an up-level process and a down-level process; FIG. 5B and FIG. 5C are message flow diagrams illustrating further steps in the method of FIG. 5A. A. FIG. 5A, FIG. 5B and FIG. 5C collectively illustrate processes that may be used to perform message version negotiation after the process of FIG. 3.

FIG. 5A, FIG. 5B and FIG. 5C each assume that a first component or process, such as an Active process, is communicating with a second component or process acting in a Standby role. For purposes of illustrating a clear example, in the description below, the Active component or peer is assumed to initiate communications to the Standby component or peer; however, this approach is not required. In one embodiment, the first and second entities to communicate are determined by another means. For example, in one implementation on a line card of a router, both the Active route processor and the Active line card may be negotiating. Thus, embodiments are not limited to communication only among entities that have Active and Standby roles.

The format of the messages that are used in an implementation of FIG. 5 may vary in different implementations. In one embodiment, however, each message described herein comprises at least a triplet of formatted data items representing a type, length, and value of the message. The type and length values may appear in a header. Use of type-length-value formatting guarantees compatibility among successive versions because new header information can be added and old header information can be deleted by including or leaving out the type-length-value element that describes the header element. Optional information can be added, and type-length-value elements that are not understood or supported by the receiver can be safely ignored. However, use of type-length-value formatting is not required; alternatively, for example, a module can issue a registration call that identifies the module as a client and provides message types by a callback function when requested by a transform function.

In block 502, the first process sends a message that includes a message type value and upper and lower version values to the second process. The message type value indicates which among many message types is represented by the message, the upper version value indicates a highest version that is supported by the first process for that type of message, and the lower version value indicates a lowest version that is supported by the first process for that type of message. For example, an Active process or component sends a message indicating message type "4", upper version value of "7" and lower version value of "3" to the Standby process. Version values may be numeric values starting at "1" and increasing monotonically whenever any change is made to the message format or contents.

Messages in FIG. 5A are communicated over an existing transport session, for example a checkpointing session or IPC session. Multiple message types may flow over the same session.

In block 508, the Standby process determines whether it can support messaging at a version level within the upper message value and lower message value range. As one example, the Standby process determines the highest message version that it can support that is within a range defined by the version values. For example, assume that the Standby process determines that the received message indicates a range of version "7" to version "3" for message type "4" and the highest version that the Standby process can support is version "4" for message type "4." As a result, the Standby process sends back a message indicating support for type "4" and version "4," as shown by block 504. Further, for this message type, both the Standby and Active process are marked as compatible and all messages between the processes may be sent and received at version 4 for message type 4, as shown in block 506.

Block 510 indicates agreement by the Active process that messages are sent and received at version "4" for message type "4.". The steps of FIG. 5B may be performed to negotiate version compatibility for other message types.

Alternatively, the Standby process may determine that it cannot support any message version within the specified range. In that case, the Standby process responds with a zero version indication, as shown in block 512. In that event, the Active process is marked as incompatible with the Standby process, as shown in block 513A. Similarly, the Standby process is marked as incompatible, as shown in block 513B.

Referring now to FIG. 5B, in block 516, the Active process sends further negotiation messages of the kind shown in FIG. 5A for all other message types that are supported by the Active process. The Active and Standby processes thereby negotiate compatibility of all supported message types in the manner shown in FIG. 5A. When the Active process has negotiated the last message type, it sends a completion message, as indicated by block 518. For example, a message 519 having a message type value of "0" and a message version value of "1" is sent. The message type value of "0" is shown as an example; any other value indicating completion may be used.

At block 520, the Active process then determines whether it can interoperate with the Standby process, based on all the message version negotiations that have just occurred. In one embodiment, block 520 involves invoking a policy callback function that results in a decision of "Compatible" or "Incompatible." If the result is "Compatible," then a compatibility message 521A is sent. As an example, a compatibility message with a message type of "0" and a value of "2" is shown, but other values may be used. Alternatively, if the Active process determines that it cannot interoperate with the Standby process or component, then at block 522 an incompatibility message is sent. In one embodiment, the incompatibility message 523A has a message type of "0," and a message version value that is a flag indicating incompatibility. For example, a flag value of "3" is shown. The message type value of "0" is shown as an example; any other value indicating completion may be used. Although a message type value of "0" is shown in FIG. 5B for certain messages for certain embodiments, in other embodiments any other suitable message type value may be used to indicate completion, compatibility or incompatibility.

The Standby process then performs a similar decision process. As indicated by arrow 525, if the Active process sent an "incompatible" message, then the Standby process can only send back an incompatibility message 523B, because any contrary decision of compatibility by the Standby process would be irrelevant at that point. If the Active process sent a compatibility message, then in block 524, the Standby process determines whether interoperation is possible with the Active process. If not, an incompatibility message 523B is sent, as shown by block 526, which would require the Active process to change its decision and mark itself as "incompatible." Alternatively, a compatibility message 521B is sent.

Referring now to FIG. 5C, if the compatibility decision of either the Active process or the Standby process indicates incompatibility, as shown by block 528, then the peer processes are considered to have agreed on incompatibility, as shown by block 532. If neither decision indicates incompatibility, then messages are sent and received at the agreed-upon version level for each message type.

If incompatibility is agreed upon, the Standby process reverts to non-stateful behavior. Other clients will continue to be stateful and the system will continue in stateful switchover mode. Other switchover techniques, which may not provide for continuity of feature operation through a switchover may be used.

If the peers are line cards and are found to be incompatible, a line card reload may be forced to bring the line card image up to the current support level.

In one embodiment, the process of FIG. 5A is initiated by a first process and a second process running on a route processor, line card, or other element, replies to messages initiated by the first process. The version exchange herein is performed on a client-session by client-session basis. On each session, each supported message type is sent in turn until all of the message types supported by the first process on that session are negotiated. The first and second processes may run on route processors, line cards, or other elements that are acting either in an Active or Standby role.

To process deleted or added message types, an up-level message client is required to provide a transform for messages that have been deleted. For deleted message types, a transform that will handle the last version of a now deleted message type is provided. Providing such a transform ensures that peers remain compatible even it support for a deleted message is discontinued by a client. When new messages are added, the up-level client provides a transformation function that can simulate the default expected action from the peer message client and simulate any expected reply. Only the up-level message client can distinguish between the two cases and handle them appropriately.

A message that formerly flowed in only one direction and now flows in both, or a message that used to flow in both directions and now flows in only one can be handled as a special case of an added or deleted message, respectively.

The use of partial compatibility, in certain embodiments, addresses message processing issues that arise when a particular message is not supported by one peer, but the lack of support is unimportant because that message type is never used in a particular configuration. In this situation, an application cannot determine that the unsupported message type doesn't matter at the time of the version exchange. However, applications that provide messages that are not used in a particular configuration may determine that such messages are not supported. In that case, the affected application will revert to a mode of operation that does not support stateful switchover.

3.4 Capability Exchange

The results of a capability exchange approach may be combined with the results of message exchange as described herein to create values for the compatibility matrix. When two peer processes have different implementations, it is likely that the process residing in the image with the higher version value, a particular feature or protocol has functionality not found in or not supported by the process with the lower version value. It is also possible that an up-level process may remove functionality as compared to a down-level process. Such a difference in functionality presents a problem for interoperation because one of the peers may not be able to reliably represent a state value that is maintained by the other peer. For example, if a particular up-level protocol supports 10,000 sessions and the down-level version of the same protocol supports only 2,000 sessions, the down-level peer cannot maintain state information for the $2,001^{st}$ through $10,000^{th}$ session.

In one approach, all clients within a process exchange and negotiate the capabilities that they support that can affect their peer. Capabilities are application-specific and are parsed by the application itself and negotiated before any application state data is exchanged, and before any message exchange is performed, so that the messages that are negotiated may be tailored to the features that are supported. If the peers cannot agree on a compatible set of capabilities, then the peers determine that they are incompatible and update their exchange status. The exchange status information may be used subsequently as part of determining an appropriate entry of the compatibility matrix. Alternatively, the peers negotiate a least-common set of capabilities. Thus, continuing with the above example, the peers could agree to support only 2,000 sessions.

3.5 Other Versioning Approaches

Certain embodiments have been described above in the context of peer processes that are network operating system images. Distributed routers such as router 100 of FIG. 1B have a distributed environment in that the router consists of at least two route processors and a plurality of line cards that communicate. In certain embodiments non-disruptive upgrade of router code images other than operating system images used on route processors is supported, by using versioning with such other images.

For example, line card images may be versioned. In some embodiments of distributed routers, line card images are bundled with the operating system image that is loaded on the route processor. Line card image compatibility is crucial to enabling a software upgrade without impacting a network. In an upgrade situation, each route processor potentially has different versions of the line card image(s) included.

In one approach, the versioning approach described above is used. Alternatively, a basic image versioning approach may be used. In basic image versioning, one image may be differentiated from another to support a Minimum Disruptive Restart (MDR) technique. In MDR, a route processor can determine if an image currently loaded and executing on a line card is compatible with the version of the network operating system and the driver operating on the route processor. If the versions are compatible, no reload is required; if not, a reload or some other mechanism that supports interoperation between the "incompatible" versions is implemented.

Further, FPGA, microcode and firmware image versioning may be provided. Line cards and other system components in a distributed router likely include FPGA, microcode, and firmware images. To achieve the objective of impacting service as little as possible during an upgrade, image upgrades for such images generally are performed only when required due to an incompatibility or upon specific user request. In an FPGA, microcode, and firmware imaging approach, versioning enables a system to determine which upgrades are required when a new operating system image is loaded. Versioning of FPGA, microcode or firmware may enable reloading such elements with new images in a non-disruptive manner, and also enables properly managing upgrades and understanding when an upgrade is required.

Component or module versioning facilitates identifying different versions of particular components or modules of software within an operating system release or version. Component or module versioning may be performed with methods analogous to the image versioning approaches described above but at a more granular level. The interaction of dependent modules within a system, including public APIs or messaging, is managed to determine and deal with compatibility. For example, an external dependency database is provided.

Data version transformations also can be applied to stored data, such as files in non-volatile storage such as flash memory, disk, etc., or data structures stored in volatile storage. Databases used by route processors, such as checkpoint databases, may be versioned. Data transformations may be applied to database entries as each checkpoint request is processed against the database.

4.0 Implementation Mechanisms—Hardware Overview

Figure 6:
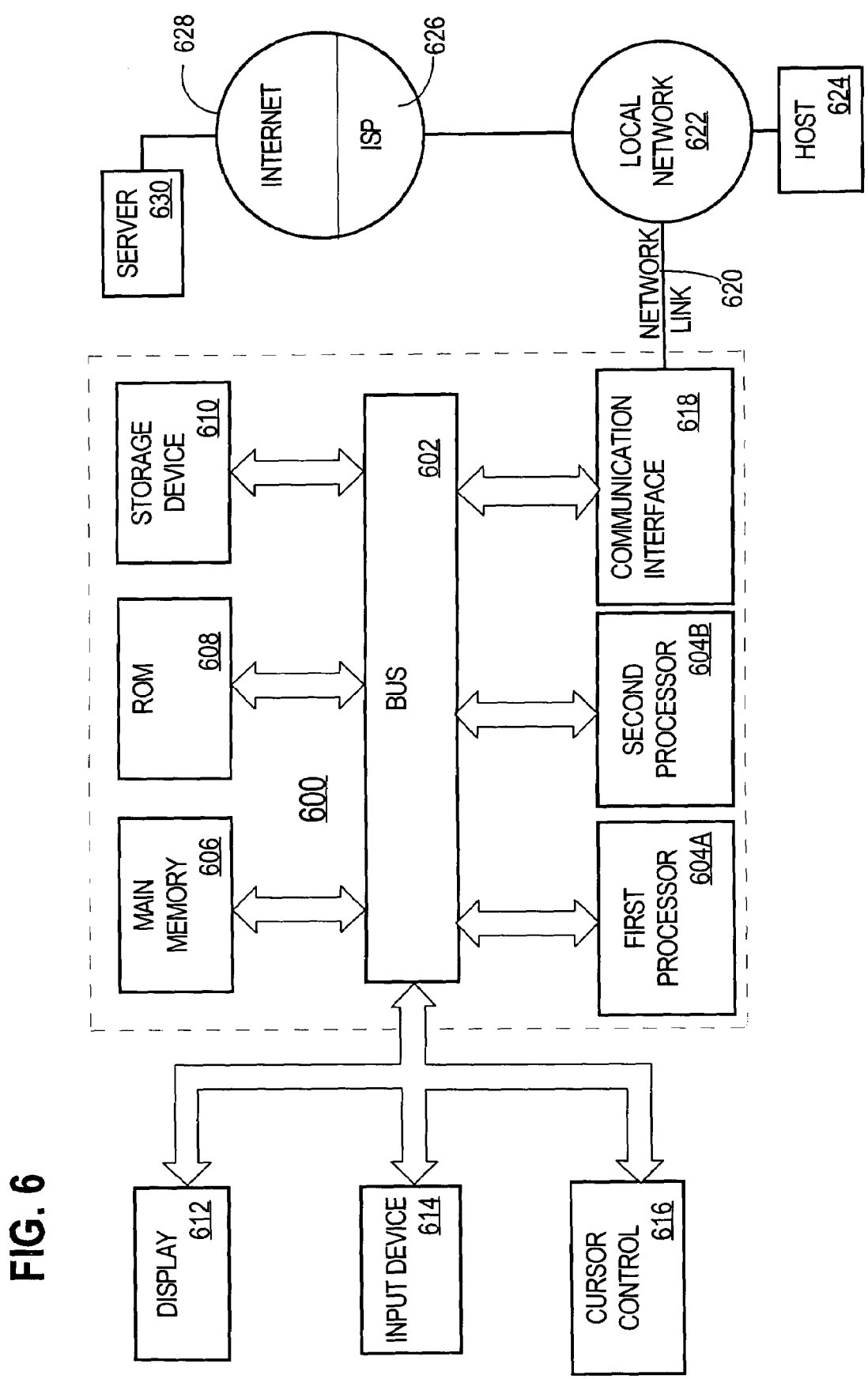
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, a first processor 604A coupled with bus 602 for processing information, and a second processor 604B also coupled to bus 602. Processors 604A, 604B are redundant processors.

Computer system 600 also includes a main memory 606, such as a random access memory ("RAM") or other dynamic storage device, coupled to bus 602 for storing information and instructions to be executed by processors 604A, 604B. Main memory 606 also may be used for storing temporary variables or other intermediate information during execution of instructions to be executed by processors 604A, 604B. Computer system 600 further includes a read only memory ("ROM") 608 or other static storage device coupled to bus 602 for storing static information and instructions for processors 604A, 604B. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processors 604A, 604B. Another type of user input device is cursor control 616, such as a mouse, trackball, stylus, or cursor direction keys for communicating direction information and command selections to processors 604A, 604B and for controlling cursor movement on display 612. This input device typically has two degrees of freedom in two axes, a first axis (e.g., x) and a second axis (e.g., y), that allows the device to specify positions in a plane.

Many of the foregoing components are optional in a computer configuration that is used to implement the invention. For example, an entirely software-based router could be implemented using two processors serving as route processors, RAM, a system bus and a means for interconnecting the two processors with respective ROMs and communication interface(s). Further, a storage device is not required, and display 612, input device 614, and cursor control 616 are optional. In still other embodiments, the invention is implemented on a general purpose computer system that is not involved in network routing, so that elements 620 to 630, inclusive, are omitted.

The invention is related to the use of computer system 600 for providing interoperation of computer processes of different versions. According to one embodiment of the invention, interoperation of computer processes of different versions is provided by computer system 600 in response to processors 604A, 604B executing one or more sequences of one or more instructions contained in main memory 606. Such instructions may be read into main memory 606 from another computer-readable medium, such as storage device 610. Execution of the sequences of instructions contained in main memory 606 causes processors 604A, 604B to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processors 604A, 604B for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604A, 604B for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processors 604A, 604B retrieve and execute the instructions. The instructions received by main memory 606 may optionally be stored on storage device 610 either before or after execution by processors 604A, 604B.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for interoperation of computer processes of different versions as described herein.

The received code may be executed by processors 604A, 604B as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing interoperation of a first execution image of a first version and a second execution image of a second version, the method comprising the computer-implemented steps of:

receiving a compatibility matrix specifying whether the versions are compatible, base-level compatible, or incompatible;

determining the versions of the first execution image and second execution image;

identifying an entry in the compatibility matrix corresponding to the versions; and operating the execution images in a stateful switchover mode when the identified entry of the compatibility matrix specifies that the versions are either compatible or base-level compatible;

wherein operating the execution images in a stateful switchover mode comprises operating the first execution image with a first processor of a dual-processor system and concurrently operating the second execution image with a second processor of the system.

2. A method as recited in claim 1, further comprising the steps of:

receiving a list of base-level components for which compatibility is required if the first version and second version are compatible;

negotiating compatibility among each of the base-level components of the first version and a corresponding base-level component of the second version;

determining, based on the list of base-level components and based on the negotiating step, whether the first version and second version are compatible, base-level compatible, or incompatible; and storing, in the compatibility matrix, an entry associated with the first version and second version of the execution images, wherein the entry indicates the first version and second version are compatible, base-level compatible, or incompatible.

3. A method as recited in claim 2, further comprising the steps of:

repeating the steps of negotiating, determining, and storing for all peer versions of the execution images to result in creating and storing a fully-populated compatibility matrix.

4. A method as recited in claim 2, further comprising the steps of creating and storing the compatibility matrix based on a message version negotiation, wherein the message version negotiation comprises the steps of:

from the first execution image, sending a first message that specifies a message type and a range of acceptable message versions;

receiving a second message that specifies the same message type and a message version within the range;

determining whether support for the message version is available; and sending a third message that specifies compatibility when support for the message version is available.

5. A method as recited in claim 4, further comprising the step of sending a fourth message specifying incompatibility, when support for the message version is unavailable.

6. A method as recited in claim 4, wherein the message version of the second message comprises a highest version value within the range that is supported by a peer execution image.

7. A method as recited in claim 4, further comprising the steps of:

determining, based on the first message, whether interoperation with the first execution image is possible;

sending a compatibility message as the second message when interoperation with the first execution image is possible; and sending an incompatibility message as the second message when interoperation with the second execution image is not possible.

8. A method as recited in claim 2, further comprising the steps of creating and storing the compatibility matrix based on a capability negotiation that further determines whether the components are compatible on a session-by-session basis.

9. A method as recited in claim 8, wherein the capability negotiation comprises the steps of:

determining that the components are incompatible for a then-current session if the capability negotiation fails;

performing the message version negotiation recited in claim 4 only when the capability negotiation succeeds; and determining that the components are compatible only when the message version negotiation succeeds.

10. A method as recited in claim 9, further comprising the step of creating and storing results of the capability negotiation and message version negotiation for pairs of components for a particular session for use by a compatibility matrix utility that creates the compatibility matrix based on the results.

11. A method as recited in claim 9, further comprising the steps of storing results of the capability negotiation and message version negotiation for pairs of components of the execution image of first version for a particular session as part of that execution image.

12. A method as recited in claim 11, further comprising the steps of:

retrieving, from the execution images of the first version and the second version, all pairs of results for corresponding clients associated with the first version and the second version; and determining whether the first version and the second version are compatible, base-level compatible or incompatible based on all pairs of results.

13. A method as recited in claim 2, further comprising performing the steps of negotiating, determining and storing with respect to a plurality of stateful clients associated with the execution images.

14. A method as recited in claim 2, further comprising the steps of configuring the first execution image and second execution image in a mode to generate compatibility information used to build the compatibility matrix entry for any two image versions.

15. A method as recited in claim 1, wherein the first execution image and the second execution image run on route processors of a distributed router, and further comprising the step of operating the first execution image and the second execution image in a mode which does not support stateful switchover of the route processors when the identified entry of the compatibility matrix specifies that the first version and the second version are incompatible.

16. A method as recited in claim 1, wherein the first execution image and the second execution image run on redundant route processors of a distributed router, and wherein the steps of claim 1 are performed as part of initialization of the redundant route processors.

17. A method as recited in claim 1, wherein one execution image among the first and second execution images performs message transformations for all messages sent or received at an agreed version value.

18. A computer-readable storage medium carrying one or more sequences of instructions for providing interoperation of a first execution image of a first version and a second execution image of a second version, which instructions, when executed by one or more processors, cause the one or more processors to carry out the steps of:
receiving a compatibility matrix specifying whether the versions are compatible, base-level compatible, or incompatible;
determining the versions of the first execution image and second execution image;
identifying an entry in the compatibility matrix corresponding to the versions; and
operating the execution images in a stateful switchover mode when the identified entry of the compatibility matrix specifies that the versions are either compatible or base-level compatible;
wherein operating the execution images in a stateful switchover mode comprises operating the first execution image with a first processor of a dual-processor system and concurrently operating the second execution image with a second processor of the system.

19. An apparatus for providing interoperation of a first execution image of a first version and a second execution image of a second version, comprising:
means for receiving a compatibility matrix specifying whether the versions are compatible, base-level compatible, or incompatible;
means for determining the versions of the first execution image and second execution image;
means for identifying an entry in the compatibility matrix corresponding to the versions; and
means for operating the execution images in a stateful switchover mode when the identified entry of the compatibility matrix specifies that the versions are either compatible or base-level compatible;
wherein the operating means comprises means for operating the first execution image with a first processor of a dual-processor system and for concurrently operating the second execution image with a second processor of the system.

20. The apparatus as recited in claim 19, further comprising:
means for receiving a list of base-level components for which compatibility is required if the first version and second version are compatible;
means for negotiating compatibility among each of the base-level components of the first version and a corresponding base-level component of the second version;
means for determining, based on the list of base-level components and based on the negotiating step, whether the first version and second version are compatible, base-level compatible, or incompatible; and
means for storing, in the compatibility matrix, an entry associated with the first version and second version of the execution images, wherein the entry indicates the first version and second version are compatible, base-level compatible, or incompatible.

21. The apparatus as recited in claim 20, further comprising means for configuring the first execution image and second execution image in a mode to generate compatibility information used to build the compatibility matrix entry for any two image versions.

22. The apparatus as recited in claim 19, wherein the first execution image and the second execution image run on redundant route processors of a distributed router, and wherein the means of claim 20 comprise part of means for initialization of the redundant route processors.

23. The apparatus as recited in claim 20, further comprising means for creating and storing the compatibility matrix based on a means for message version negotiation, wherein the means for message version negotiation comprises: means for sending, from the first execution image, a first message that specifies a message type and a range of acceptable message versions; means for receiving a second message that specifies the same message type and a message version within the range; means for determining whether support for the message version is available; and means for sending a third message that specifies compatibility when support for the message version is available.

24. The apparatus as recited in claim 23, further comprising:
means for determining, based on the first message, whether interoperation with the first execution image is possible;
means for sending a compatibility message as the second message when interoperation with the first execution image is possible; and
means for sending an incompatibility message as the second message when interoperation with the second execution image is not possible.

25. The apparatus as recited in claim 20, further comprising means for creating and storing the compatibility matrix based on means for determining whether the components are compatible on a session-by-session basis.

26. The apparatus as recited in claim 25, wherein the means for capability negotiation comprises:
means for determining that the components are incompatible for a then-current session if the capability negotiation fails;
means for performing the message version negotiation recited in claim 7 only when the capability negotiation succeeds; and
means for determining that the components are compatible only when the message version negotiation succeeds.

27. The apparatus as recited in claim 20, further comprising means for negotiating, determining and storing with respect to a plurality of stateful clients associated with the execution images.

28. The apparatus as recited in claim 19, wherein the first execution image and the second execution image run on route processors of a distributed router, and further comprising means for operating the first execution image and the second execution image in a mode which does not support stateful switchover of the route processors when the identified entry of the compatibility matrix specifies that the first version and the second version are incompatible.

29. An apparatus for providing interoperation of a first execution image of a first version and a second execution image of a second version, comprising:
a network interface that is coupled to the data network for receiving one or more packet flows therefrom;
one or more processors;
a computer-readable storage medium comprising one or more stored sequences of instructions which,
when executed by the one or more processors, cause the one or more processors to carry out the steps of:

receiving a compatibility matrix specifying whether the versions are compatible, base-level compatible, or incompatible;

determining the versions of the first execution image and second execution image;

identifying an entry in the compatibility matrix corresponding to the versions; and operating the execution images in a stateful switchover mode when the identified entry of the compatibility matrix specifies that the versions are either compatible or base-level compatible;

wherein operating the execution images in a stateful switchover mode comprises operating the first execution image with a first processor of a dual-processor system and concurrently operating the second execution image with a second processor of the system.

30. The apparatus of claim 29, further comprising instructions which when executed cause:

receiving a list of base-level components for which compatibility is required if the first version and second version are compatible;

negotiating compatibility among each of the base-level components of the first version and a corresponding base-level component of the second version;

determining, based on the list of base-level components and based on the negotiating step, whether the first version and second version are compatible, base-level compatible, or incompatible; and storing, in the compatibility matrix, an entry associated with the first version and second version of the execution images, wherein the entry indicates the first version and second version are compatible, base-level compatible, or incompatible.

31. The apparatus of claim 30, further comprising instructions which when executed cause configuring the first execution image and second execution image in a mode to generate compatibility information used to build the compatibility matrix entry for any two image versions.

32. The apparatus of claim 31, wherein the first execution image and the second execution image run on route processors of a distributed router, and further comprising instructions which when executed cause operating the first execution image and the second execution image in a mode which does not support stateful switchover of the route processors when the identified entry of the compatibility matrix specifies that the first version and the second version are incompatible.

33. The apparatus of claim 30, further comprising instructions which when executed cause creating and storing the compatibility matrix based on a message version negotiation, wherein the message version negotiation comprises instructions which when executed cause:

from the first execution image, sending a first message that specifies a message type and a range of acceptable message versions;

receiving a second message that specifies the same message type and a message version within the range;

determining whether support for the message version is available; and sending a third message that specifies compatibility when support for the message version is available.

34. The apparatus of claim 33, further comprising instructions which when executed cause:

determining, based on the first message, whether interoperation with the first execution image is possible;

sending a compatibility message as the second message when interoperation with the first execution image is possible; and sending an incompatibility message as the second message when interoperation with the second execution image is not possible.

35. The apparatus of claim 30, further comprising instructions which when executed cause creating and storing the compatibility matrix based on a capability negotiation that further determines whether the components are compatible on a session-by-session basis.

36. The apparatus of claim 35, wherein the capability negotiation is executed using instructions which when executed cause:

determining that the components are incompatible for a then-current session if the capability negotiation fails;

performing the message version negotiation recited in claim 7 only when the capability negotiation succeeds; and determining that the components are compatible only when the message version negotiation succeeds.

37. The apparatus of claim 30, further comprising executing the instructions for negotiating, determining and storing with respect to a plurality of stateful clients associated with the execution images.

38. The apparatus of claim 29, wherein the first execution image and the second execution image run on redundant route processors of a distributed router, and wherein the instructions of claim 29 are executed as part of initialization of the redundant route processors.

* * * * *